(12) United States Patent
Jones et al.

(10) Patent No.: US 11,884,405 B2
(45) Date of Patent: Jan. 30, 2024

(54) WATER AND ICE DETECTION

(71) Applicant: ROLLS-ROYCE plc, London (GB)

(72) Inventors: Geoffrey B Jones, Burton-upon-Trent (GB); Edward J Spalton, Derby (GB); Steven P Culwick, Derby (GB)

(73) Assignee: ROLLS-ROYCE plc, London (GB)

( * ) Notice: Subject to any disclaimer, the term of this patent is extended or adjusted under 35 U.S.C. 154(b) by 513 days.

(21) Appl. No.: 16/683,819

(22) Filed: Nov. 14, 2019

(65) Prior Publication Data
US 2020/0189754 A1 Jun. 18, 2020

(30) Foreign Application Priority Data

Dec. 13, 2018 (GB) .................................... 1820301

(51) Int. Cl.
*B64D 15/22* (2006.01)
*F01D 17/08* (2006.01)
*F02C 7/047* (2006.01)

(52) U.S. Cl.
CPC .......... *B64D 15/22* (2013.01); *F01D 17/085* (2013.01); *F02C 7/047* (2013.01); *F05D 2270/303* (2013.01)

(58) Field of Classification Search
CPC ........ B64D 15/12; F01D 17/085; F02C 7/047
See application file for complete search history.

(56) References Cited

U.S. PATENT DOCUMENTS

| | | | |
|---|---|---|---|
| 4,210,021 A * | 7/1980 | Vykhodtsev | G01W 1/14 340/580 |
| 4,333,004 A | 6/1982 | Forgue et al. | |
| 4,379,227 A * | 4/1983 | Kovacs | B64D 15/20 340/583 |
| 5,206,806 A * | 4/1993 | Gerardi | G01M 5/0016 244/134 F |
| 5,265,414 A | 11/1993 | Mouton | |
| 5,471,831 A | 12/1995 | Rowe | |
| 6,194,685 B1 * | 2/2001 | Rutherford | B64D 15/14 219/548 |
| 6,347,767 B1 * | 2/2002 | Holmen | B64D 15/20 244/134 F |

(Continued)

FOREIGN PATENT DOCUMENTS

| | | |
|---|---|---|
| EP | 1 422 137 A1 | 5/2004 |
| EP | 3 431 720 A1 | 1/2019 |
| GB | 2 023 291 A | 12/1979 |

OTHER PUBLICATIONS

Jun. 5, 2019 Search Report issued in British Patent Application No. GB1820301.8.

(Continued)

*Primary Examiner* — Michael H Wang
(74) *Attorney, Agent, or Firm* — Oliff PLC

(57) ABSTRACT

An apparatus for the detection of either or both of water and ice within a system, more specifically, but not exclusively, the detection of either or both of water or ice crystal ingestion, or ice accretion on an aerofoil, within a gas turbine engine. The apparatus and method compares the measured temperature of the first region with a second temperature value, measured at a distinct second region of the aerofoil, wherein the second radial position of the second sensor is radially offset from the first radial position of the first sensor.

16 Claims, 9 Drawing Sheets

(56) References Cited

U.S. PATENT DOCUMENTS

| | | | |
|---|---|---|---|
| 6,644,009 B2 | 11/2003 | Myers, Jr. | |
| 7,175,136 B2* | 2/2007 | Shah | B64D 15/20 |
| | | | 244/134 F |
| 7,895,818 B2 | 3/2011 | Snell et al. | |
| 8,515,711 B2 | 8/2013 | Mitchell et al. | |
| 8,931,740 B2* | 1/2015 | Nordin | B64C 3/26 |
| | | | 244/134 R |
| 9,133,773 B2* | 9/2015 | Gould | F02C 7/047 |
| 9,201,031 B2 | 12/2015 | Lilie et al. | |
| 10,850,857 B2* | 12/2020 | Scothern | B64D 15/20 |
| 2004/0095984 A1 | 5/2004 | Severson | |
| 2005/0268710 A1 | 12/2005 | Rasmussen et al. | |
| 2008/0167764 A1 | 7/2008 | Flemming | |
| 2009/0242703 A1* | 10/2009 | Alexander | F02C 7/047 |
| | | | 29/841 |
| 2013/0158831 A1 | 6/2013 | Djelassi et al. | |
| 2014/0007654 A1 | 1/2014 | Lilie et al. | |
| 2014/0070054 A1* | 3/2014 | Burton | H01L 51/0048 |
| | | | 219/202 |
| 2014/0191084 A1* | 7/2014 | Gambino | B64D 15/12 |
| | | | 244/134 D |
| 2015/0023792 A1* | 1/2015 | Spitzner | F03D 80/40 |
| | | | 416/1 |
| 2015/0093244 A1* | 4/2015 | Wigen | G01K 13/028 |
| | | | 416/61 |
| 2015/0346122 A1* | 12/2015 | Stothers | G01N 25/72 |
| | | | 702/130 |
| 2016/0009400 A1* | 1/2016 | English | B64D 15/22 |
| | | | 62/139 |
| 2016/0024960 A1* | 1/2016 | Engler | F01D 17/08 |
| | | | 415/118 |
| 2016/0130006 A1* | 5/2016 | Brouwers | B64D 15/14 |
| | | | 416/1 |
| 2016/0377487 A1* | 12/2016 | Cheung | G01K 1/08 |
| | | | 29/611 |
| 2018/0298778 A1* | 10/2018 | Dischinger | F01D 21/10 |
| 2018/0346134 A1* | 12/2018 | Raimarckers | F01D 25/02 |
| 2019/0003463 A1* | 1/2019 | Buggy | F03D 80/40 |

OTHER PUBLICATIONS

Nov. 29, 2017 British Search Report issued in British Patent Application No. GB1711689.8.
U.S. Appl. No. 16/038,263, filed Jul. 18, 2018 in the name of Scothern.
Oct. 5, 2020 Notice of Allowance issued in U.S. Appl. No. 16/038,263.
Feb. 26, 2020 Extended Search Report issued in European Patent Application No. 19208761.7.
Jun. 26, 2020 Office Action issued in U.S. Appl. No. 16/038,263.

* cited by examiner

WATER AND ICE DETECTION

CROSS-REFERENCE TO RELATED APPLICATIONS

This specification is based upon and claims the benefit of priority from UK Patent Application Number GB 1820301.8 filed on 13 Dec. 2018, the entire contents of which are incorporated herein by reference.

BACKGROUND

Field of the Disclosure

The present disclosure concerns the detection of either or both of water and ice within a system. More specifically, but not exclusively, the disclosure concerns the detection of either or both of water or ice crystal ingestion, or ice accretion on an aerofoil, within a gas turbine engine.

Description of the Related Art

Aircraft mounted gas turbine engines must be capable of continued operation during flight encounters with ice or liquid water. Thus, ice crystal ingestion or ice accretion, i.e. the build-up of ice on surfaces, is a problem that may arise when aircraft are required to operate in conditions where the atmosphere has a high concentration of ice. The ingestion of rain, hail or heavy snow into the engine compression system may cause a number of adverse effects within the engine, such as combustor flameout, caused by the presence of liquid water within the engine's combustor. This may be especially true at low idle power setting where the low combustion temperatures and pressures can more easily result in the combustion process being extinguished. High pressure compressor surge may also be caused by an increase in the working line of the compressor from the evaporation of water within the compressor, and the additional work done by the compressor on the water. Additionally, thermal contraction of the compressor casings may lead to mechanical interaction between the compressor rotor blades and the casings, resulting in damage to or deterioration of compressor components, and a subsequent loss of compressor efficiency or stability.

The ingestion of ice crystals into the engine core may also cause a number of adverse effects within the engine. For example, compressor surge may be caused by the build-up of ice within or at the inlet to the compression system. The build-up of ice may introduce a pressure distortion which can act to reduce the nominal surge line of the compressor. Secondly, engine rollback may be caused by the build-up of ice within or at the inlet to the compression system. The build-up of ice may act as an aerodynamic blockage, restricting the mass flow rate of air through the engine and reducing power output. Thirdly, compressor damage may be caused by the impact of ice which has built up and then shed into the downstream stages of the compressor. This is normally associated with higher power operation where the rotational speed of the compressor(s) and thus impact energies are greater. Fourthly, compressor surge may be caused by the shedding of ice into the downstream stages of the compressor. Additionally, combustor flameout may be caused by sudden shedding of ice through the compressor and into the combustion chamber, particularly at low power conditions.

The atmospheric conditions that give rise to ice crystal ingestion or ice accretion are typically found at relatively low altitudes. However, certain atmospheric phenomena, such as thunderstorm activity, can result in ice crystals being present in the air at higher altitudes causing a risk of so-called 'ice crystal icing'. Thus, the ingestion of ice crystals into the engine could adversely affect the operation, or operating efficiency of the engine.

Common approaches to engine management during such weather conditions may be to proactively detect that high flow rates of rain or hail are being ingested into the engine compression system, and subsequently change either the engine operating condition or configuration when it is determined that ice crystal ingestion or ice accretion is possible. However, detecting these conditions with any certainty can be difficult. In particular, high altitude ice crystals cannot be detected with currently available ice detection systems, so current aircraft do not have means to detect ice crystal ice in the atmosphere. The crystals can be very small, and are often present in low concentrations above powerful storm systems but cannot currently be detected directly using weather radar. Due to their small size and low radar reflectivity, clouds of ice crystals are not currently detectable using conventional aircraft weather radar. They are not easily discernible by eye within the cockpit and not possible to identify by visual means during night time flying. Additionally, ice crystal clouds can be many hundreds of miles long and occupy altitudes that are consistent with the cruising altitude of commercial aircraft. Consequently it is very difficult for commercial aircraft to avoid ice crystal conditions altogether.

When determining that ice crystal ingestion or ice accretion is possible, changes to the engine operating condition may include increasing the engine power setting to increase shaft speeds and reduce the flow of rain or hail into the engine core, vaporising water before it reaches the combustor, as well as increasing compressor and combustor stability margins. Further changes to the engine operating configuration may also include the opening of compressor handling bleeds in order to extract ice or liquid water from the compression system. Altering the engine's operating point by, for example, raising idle thrust levels to increase temperatures in the compressors, increasing engine power setting in order to increase engine shaft rotation speeds or core temperatures, or by opening handling bleed valves to eject ice crystals or ice sheds from the core of the engine, may compromise the engine's operating efficiency, increasing fuel burn and operating costs. Thus, changes to the engine operating condition are preferably initiated after detecting environmental conditions likely to contain ice, but may also be altered pre-emptively to avoid the risk of ice crystal icing, even in atmospheric conditions that are not normally associated with ice crystal ingestion or ice accretion.

Crystal icing is a relatively rare phenomenon, and therefore these precautionary measures could largely be eliminated if a reliable means of detection were available. For example, as disclosed in U.S. Pat. No. 9,201,031, a system is disclosed for detecting the presence of ice crystals in a cloud comprising two thin walled semicylinder-shaped sensors in a leading edge of an airfoil.

Furthermore, it is common to make compressor rotor blades more tolerant to ice impact by increasing their thickness. Such changes, however, represent a compromising of the engine's operating efficiency and consequently degradation of fuel burn and increase in operating costs. Since flight through high concentrations of ice crystals for long durations are relatively rare events, it would be preferable if changes to engine operating condition or configuration were invoked only when ice crystal ingestion is reliably detected. Thus, it is an aim to reduce or eliminate at least some of the aforementioned problems.

SUMMARY

According to a first aspect there is provided an apparatus for detecting water or ice crystal ingestion, or ice accretion on an aerofoil as defined in appended claim 1. Also provided is an apparatus for detecting water or ice crystal ingestion, or ice accretion on an aerofoil as defined in appended claim 11. Further aspects and features may be provided as recited in the associated dependent claims.

The apparatus for detecting ice crystal ingestion or ice accretion on an aerofoil may comprise at least a first temperature sensor for determining a first temperature value at a first radial position within a first region of the aerofoil, relative to the principal rotational axis of the gas turbine engine. The apparatus may comprise a second temperature sensor for determining a second temperature value at a second radial position within a second region of the aerofoil, relative to the principal rotational axis of the gas turbine engine. The apparatus may comprise a comparator for comparing the first temperature value with the second temperature value. The second radial position of the second sensor may be radially offset from the first radial position of the first sensor. Either or both of the first temperature sensor and the second temperature sensor may be positioned aft of a leading edge of the aerofoil.

Thus, relative to previously known arrangements, the invention may be increasingly sensitive to ice or liquid water ingestion within a gas turbine engine. Furthermore, when located within a compressor section, the arrangement is capable of directly detecting the presence of ice or liquid water within the compressor, without inference of compressor ice or liquid water flow rates from intake mounted probes and knowledge of other factors such as engine fan speed. Additionally, if embedded within an aerofoil or other static structure, the arrangement may provide the potential to reduce compressor aerodynamic loss and engine specific fuel consumption, whilst increasing the protection of sensors from matter ingested into the engine.

The arrangement also provides the freedom to install the detection system over a range of axial positions within the compression system, offering the ability to install the sensor system in a region of the compressor which is reliably free from super cooled liquid water ice accretion. Such a region may be downstream of, for example, the third stage of the compression system. The arrangement also provides the ability to install the sensor system in a region of the compressor which is reliably exposed to super cooled liquid water ice accretion, and in particular, in a region where the maximum temperature depressions at the outer wall are typically seen. Such regions may be established by the engine manufacturer based on analytical or experimental knowledge of compressor behaviour.

The apparatus may comprise a first heater for applying heat to the first region of the aerofoil. The apparatus comprises a second heater for applying heat to the second region of the aerofoil.

Thus, the arrangement may provide two or more sensors positioned within a main gas path. Each of the two or more sensors may comprise a heater for heating the area adjacent to or around the each respective sensor. Each sensor may be either or both of at least partially embedded within, or integrated with, the turbomachinery casing or statics in order to protect the probe from erosion and impact related deterioration. The arrangement may therefore provide a means of detecting whether ice or liquid water is being ingested into a gas turbine engine compressor. Such detection may measure, either directly or indirectly, the change in radial (spanwise) temperature profile, within a given stage, or stages, of the compressor. The temperature profile may be caused by the sublimation, melting or evaporation of liquid water or ice together with the centrifugal action of the rotors on the ice or water.

At least one sensor may be positioned towards the outer annulus line. By towards the outer annulus line, it meant that at least one sensor is relatively closer to the outer annulus line than, or radially offset from, a further sensor. As such, at least one sensor may be situated in a radially outwardly region that is reliably subjected to an intercooling effect of one or more of rain, hail or ice crystals. Such intercooling occurs as ice or water moves through the compression system, as it adopts a bias towards the outer annulus line due to the centrifugal action of the compressor rotors on the ice crystals, water droplets or water film. Thus, thermal energy is given up by the air and turbomachinery surfaces as ice is melted, or water is evaporated within the compressor. This leads to a temperature depression within the outer radial section of the compressor. Such a region may be referred to as a 'wet' region. The sensor within the wet region may be referred to as the wet sensor.

At least one sensor may be positioned towards the inner annulus line. By towards the inner annulus line, it meant that at least one sensor is relatively closer to the inner annulus line than, or radially offset from, a further sensor. As such, at least one sensor may be situated in a radially inward region that is reliably free from an intercooling effect of one or more of rain, hail or ice crystals. Such a region may be referred to as a dry region. The sensor within the dry region may be referred to as the dry sensor. As the wet sensor is cooled by the ingested water or ice, a difference in power consumption between the wet sensor and the dry sensor may be compared and may be used for detection of ice formation, and the subsequent activation of engine protection systems via the EEC.

In the event of ice build-up on any part/region of a component, the heat energy applied may be largely absorbed in melting the ice rather than in raising the temperature of the component. The measured temperature will thus tend to be driven close to zero degrees Celsius. Comparing the measured temperature with a reference value, for example a temperature limit in the range of zero to five degrees Celsius such as one or two degrees Celsius, can provide an indication of ice accretion on a region of the component.

The comparison may be repeated, such that a rate of heating can be compared to a set of reference temperature values forming a heating profile. If the determined temperature is seen to be moving or increasing very slowly, or more slowly than expected, then there is an indication that it is being lagged or buffered by the presence ice.

The reliable detection of ice helps to avoid the need for unnecessary changes in engine operating point, thus increasing efficiency. In addition, compressor rotor blades and other engine components need not be made so robust if there is increased confidence that ice accretion can be avoided, so material and manufacturing costs can also be reduced.

Providing two or more radially temperature sensors, each paired with an electrical heating element, allows the apparatus to monitor respective sensor outputs relative to environmental conditions and/or ambient temperatures, and hence provides the ability to reliably detect ice formation, or ice crystal ingestion. For example, where the apparatus is located in a gas compressor stream, the two temperature readings will show a stable relationship with compressor gas stream temperature during normal operation. Continued monitoring of the temperature difference between the two sensors may provide an indication of when the temperature difference departs from the expected relationship. This information can then be interpreted, potentially with confirmation from other engine sensors, as indicating either of both of ice crystal ingestion, the accretion of ice on a component, or the potential for such ingestion or accretion to occur.

Again, repeated measurements and comparisons may be performed to allow a comparison of heating profiles.

The apparatus may be used for the detecting ice crystal ingestion or ice accretion on an aerofoil of a gas turbine engine. In some examples, the first region may, for example, comprise a platform of the aerofoil. The first region may comprise a trailing edge. The first region may comprise a leading edge. The first region may comprise a suction surface. The first region may comprise a pressure surface. In some examples, the second region may, for example, comprise a platform of the aerofoil. The second region may comprise a trailing edge. The second region may comprise a leading edge. The second region may comprise a suction surface. The second region may comprise a pressure surface.

The or each of the first and second heater may be located on or at least partially within the aerofoil. For example, the or each of the first and second heater may be mounted on the pressure surface, suction surface, leading edge or trailing edge of a vane or strut in a region of interest. For example, the or each heater may be located on a so-called 'intercase strut', i.e. a strut associated with a compressor intermediate casing that sits between an intermediate pressure compressor and a high pressure compressor.

The or each heater may comprise an electrical heating element.

The aerofoil may be an electrically conductive member. The aerofoil may be configured so that upon application of a current, an electrical property of the first common aerofoil may be monitored to determine a temperature.

The electrical property may be resistance. The electrical property may be impedance.

The arrangement may comprise two or more sets of respective heaters and sensors of the type described above, wherein the second or further set of respective heaters and sensors my be axially offset from the first set of respective heaters and sensors.

The arrangement may comprise two or more sets of the respective heaters and sensors as previously described. The second or further set of respective heaters and sensors may be axially offset from the first set of respective heaters and sensors. Thus, the second or further set of respective heaters and sensors may be in communication with the comparator for comparing the temperatures determined by the first set of respective heaters and sensors and the second or further set of respective heaters and sensors. For example, a bleed offtake, or further such component or engine feature, may be situated between the first set and second set of respective heaters and sensors. The power consumption requirements from the sensors may be used to determine, how much water/ice is being extracted by the offtake and, for example, how quickly the intercase plenum needs to be evacuated. Alternatively, the introduction of a second or further set of respective heaters and sensors in more than one stage of compression could be used to better resolve the location within the compressor that ice crystal accretion is occurring. Thus, the or each set of sensors, or the overall sensor arrangement, may be located within a compressor section.

A vane or a strut for use in a gas turbine engine, such as an intercase strut as described above, may comprise apparatus as previously described, and a gas turbine engine may comprise such a vane or strut.

The described method of detecting either or both of ice crystal ingestion and ice accretion on an aerofoil, within a gas turbine engine having a principal rotational axis, may comprise, at least, steps to determine a first temperature value at a first radial position within the first region of the aerofoil, relative to the principal rotational axis of the gas turbine engine, with the first temperature sensor, and steps to determine a second temperature value at the second radial position within the second region of the aerofoil, relative to the principal rotational axis of the gas turbine engine, with the second temperature sensor. The described method may comprise steps to compare the first temperature value with the second temperature value, wherein ice crystal ingestion or ice accretion is detected based on the comparison of the first temperature value with the second temperature value, during use.

Alternatively, ice crystal ingestion or ice accretion may be detected based on a comparison of the monitored temperatures of the first region with a reference temperature close to zero degrees Celsius, for example in the range of zero to five degrees Celsius such as one or two degrees Celsius.

Heat may be applied directly to the first region of the aerofoil and/or to the second region of the aerofoil.

In some examples, the first region may, for example, comprise a platform of the aerofoil. The first region may comprise a trailing edge. The first region may comprise a leading edge. The first region may comprise a suction surface. The first region may comprise a pressure surface. In some examples, the second region may, for example, comprise a platform of the aerofoil. The second region may comprise a trailing edge. The second region may comprise a leading edge. The second region may comprise a suction surface. The second region may comprise a pressure surface.

Heat may be applied using an electrical heating element. Heat may be applied to the first and/or second region constantly during use of the aerofoil. Alternatively, the heat may be applied to heat the first and/or second region to an equilibrium temperature, and the comparing step may be performed only once the first and/or second region has reached said equilibrium temperature. Alternatively, the rate of temperature increase of a region may be monitored as the heat is applied to provide a measured heating profile which is compared to a reference heating profile.

In either case the heat need not be applied to the aerofoil constantly. Heat may be applied only once, periodically, at irregular intervals or on demand, for example when the engine operating point changes, or based on some other trigger. The heat may be applied for a predetermined amount of time or until a set temperature or engine operating point is reached, or the application of heat may be entirely controlled by a user.

Accordingly, in a second aspect, there is provided an apparatus for detecting water or ice crystal ingestion, or ice accretion on an aerofoil. The apparatus may comprise a first temperature sensor and a second temperature sensor positioned aft of a leading edge of the aerofoil, wherein a second radial position of the second sensor may be radially offset from a first radial position of the first sensor. The apparatus may comprise a controller configured to read computer readable instructions to execute steps to determine a first temperature value at the first radial position within the first region with the first temperature sensor; determine a second temperature value at the second radial position within the second region with the second temperature sensor; and, compare the first temperature value with the second temperature value; wherein ice crystal ingestion or ice accretion is detected based on the comparison of the first temperature value with the second temperature value, during use.

The apparatus may comprise a first heater and comprise a step to apply heat from the first heater to a first region of the aerofoil, during use. The apparatus may comprise a second heater and comprise a step to apply heat from the second heater to a second region of the aerofoil, during use.

Heat may be applied directly to the first region of the aerofoil. Heat may be applied directly to the second region of the aerofoil. The heater may comprise an electrical heating element.

The aerofoil may be an electrically conductive member. The aerofoil may be configured so that upon application of a current, an electrical property of the aerofoil may be monitored to determine a temperature.

The electrical property may be resistance. The electrical property may be impedance.

The arrangement may comprise two or more sets of respective heaters and sensors of the type described above, wherein the second or further set of respective heaters and sensors may be axially offset from the first set of respective heaters and sensors.

The controller may be configured to read computer readable instructions to control the first and/or second heater to apply heat constantly during use of the aerofoil.

The controller may be configured to read computer readable instructions to control the first and/or second heater to apply heat to heat a region to an equilibrium temperature, and the comparing step may be performed only once said region has reached said equilibrium temperature.

The apparatus may further comprise a memory, and the controller may be configured to read computer readable instructions to execute the additional steps to monitor the rate of temperature increase of the first region as the heat is applied to provide a measured heating profiles, store the measured heating profiles in the memory, and compare the measured heating profiles, in the comparing step, to reference temperature profiles.

The controller may comprise a comparator. The comparator may compare the temperature determined by the first temperature sensor with the temperature determined by the second temperature sensor.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge.

The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following:

1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
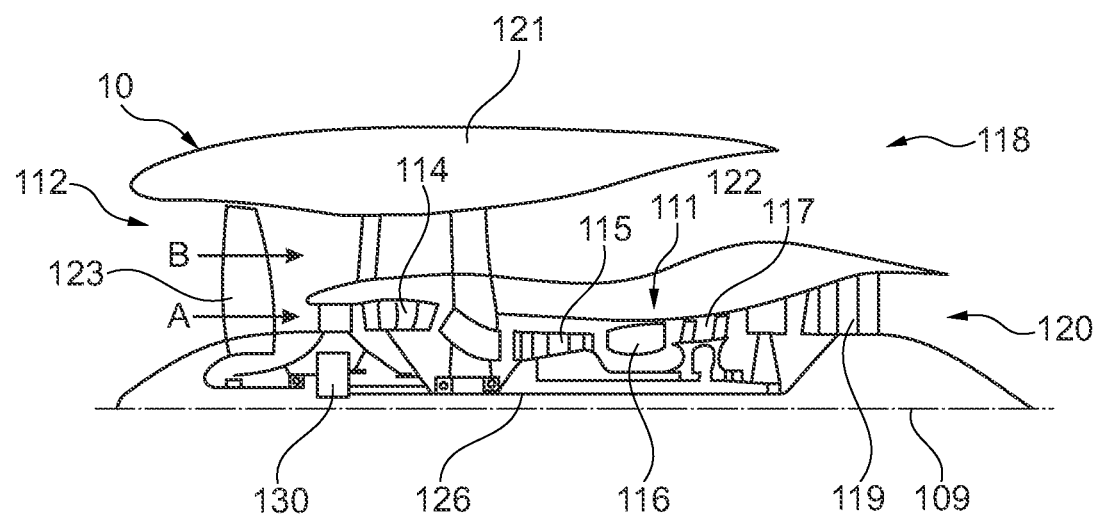
FIG. 1 shows a sectional side view of a gas turbine engine.

FIG. 1 illustrates a gas turbine engine 10 having a principal rotational axis 109. The engine 10 comprises an air intake 112 and a propulsive fan 123 that generates two airflows: a core airflow A and a bypass airflow B. The gas turbine engine 10 comprises a core 111 that receives the core airflow A. The engine core 111 comprises, in axial flow series, a low pressure compressor 114, a high-pressure compressor 115, combustion equipment 116, a high-pressure turbine 117, a low pressure turbine 119 and a core exhaust nozzle 120. A nacelle 121 surrounds the gas turbine engine 10 and defines a bypass duct 22 and a bypass exhaust nozzle 118. The bypass airflow B flows through the bypass duct 122. The fan 123 is attached to and driven by the low pressure turbine 119 via a shaft 126 and an epicyclic gearbox 130.

In use, the core airflow A is accelerated and compressed by the low pressure compressor 114 and directed into the high pressure compressor 115 where further compression takes place. The compressed air exhausted from the high pressure compressor 115 is directed into the combustion equipment 116 where it is mixed with fuel and the mixture is combusted. The resultant hot combustion products then expand through, and thereby drive, the high pressure and low pressure turbines 117, 119 before being exhausted through the nozzle 120 to provide some propulsive thrust. The high pressure turbine 117 drives the high pressure compressor 115 by a suitable interconnecting shaft 127. The fan 123 generally provides the majority of the propulsive thrust. The epicyclic gearbox 130 is a reduction gearbox.

Figure 2:
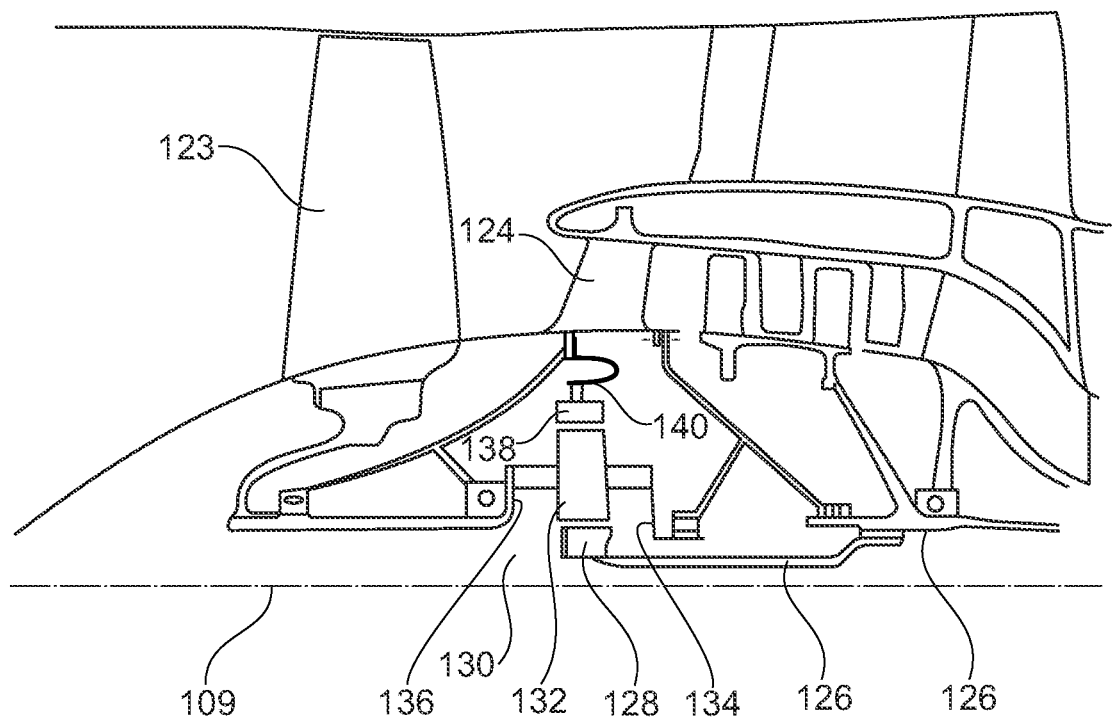
FIG. 2 shows an expanded sectional side view of a gearbox and compression section of the gas turbine of FIG. 1.

An exemplary arrangement for a geared fan gas turbine engine 10 is shown in FIG. 2. The low pressure turbine 119 (see FIG. 1) drives the shaft 126, which is coupled to a sun wheel, or sun gear, 128 of the epicyclic gear arrangement 130. Radially outwardly of the sun gear 128 and intermeshing therewith is a plurality of planet gears 132 that are coupled together by a planet carrier 134. The planet carrier 134 constrains the planet gears 132 to precess around the sun gear 128 in synchronicity whilst enabling each planet gear 132 to rotate about its own axis. The planet carrier 134 is coupled via linkages 136 to the fan 123 in order to drive its rotation about the engine axis 109. Radially outwardly of the planet gears 132 and intermeshing therewith is an annulus or ring gear 138 that is coupled, via linkages 140, to a stationary supporting structure 124.

Note that the terms "low pressure turbine" and "low pressure compressor" as used herein may be taken to mean the lowest pressure turbine stages and lowest pressure compressor stages (i.e. not including the fan 123) respectively and/or the turbine and compressor stages that are connected together by the interconnecting shaft 126 with the lowest rotational speed in the engine (i.e. not including the gearbox output shaft that drives the fan 123). In some literature, the "low pressure turbine" and "low pressure compressor" referred to herein may alternatively be known as the "intermediate pressure turbine" and "intermediate pressure compressor". Where such alternative nomenclature is used, the fan 123 may be referred to as a first, or lowest pressure, compression stage.

Figure 3:
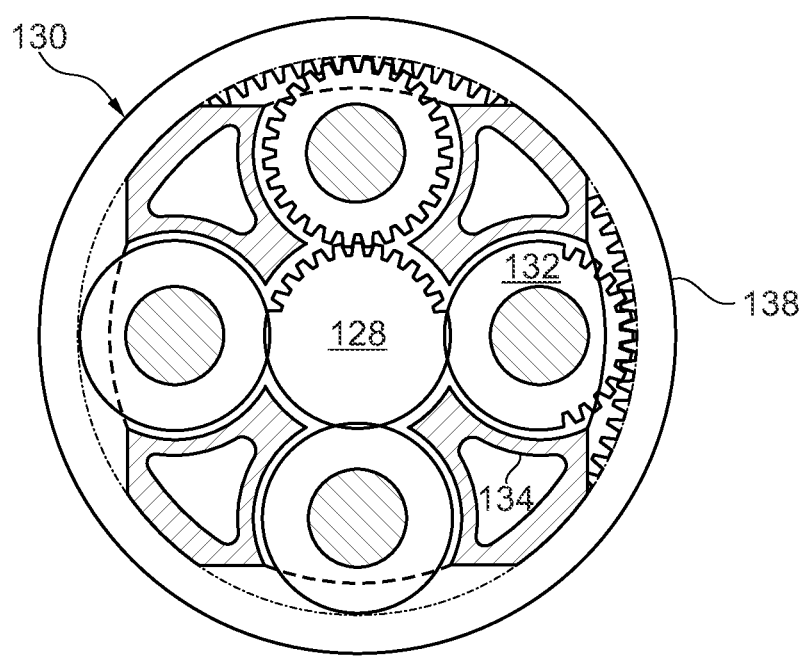
FIG. 3 shows a sectional frontal view of the gearbox.

The epicyclic gearbox 130 is shown by way of example in greater detail in FIG. 3. Each of the sun gear 128, planet gears 132 and ring gear 138 comprise teeth about their periphery to intermesh with the other gears. However, for clarity only exemplary portions of the teeth are illustrated in FIG. 3. There are four planet gears 132 illustrated, although it will be apparent to the skilled reader that more or fewer planet gears 132 may be provided within the scope of the claimed invention. Practical applications of a planetary epicyclic gearbox 130 generally comprise at least three planet gears 132.

The epicyclic gearbox 130 illustrated by way of example in FIGS. 2 and 3 is of the planetary type, in that the planet carrier 134 is coupled to an output shaft via linkages 136, with the ring gear 138 fixed. However, any other suitable type of epicyclic gearbox 130 may be used. By way of further example, the epicyclic gearbox 130 may be a star arrangement, in which the planet carrier 134 is held fixed, with the ring (or annulus) gear 138 allowed to rotate. In such an arrangement the fan 123 is driven by the ring gear 138. By way of further alternative example, the gearbox 130 may be a differential gearbox in which the ring gear 138 and the planet carrier 134 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 130 in the engine 10 and/or for connecting the gearbox 130 to the engine 10. By way of further example, the connections (such as the linkages 136, 140 in the FIG. 2 example) between the gearbox 130 and other parts of the engine 10 (such as the input shaft 126, the output shaft and the fixed structure 124) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 130 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 118, 120 meaning that the flow through the bypass duct 122 has its own nozzle 118 that is separate to and radially outside the core engine nozzle 120. However, this is not limiting, and any aspect of the present disclosure may also apply to engines in which the flow through the bypass duct 122 and the flow through the core 111 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 130.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Unless otherwise stated, the terms "axial" or "axially" refer to the principal and rotational axis 109, describing a dimension along a longitudinal axis of the gas turbine engine 10. The terms "aft" or "downstream", unless otherwise stated, refers to a direction towards either or both of the rear and outlet of the gas turbine engine 10 relative to the principal and rotational axis 109. The terms "forward" or "upstream", unless otherwise stated, refers to a direction towards either or both of the front and inlet of the gas turbine engine 10 relative to the principal and rotational axis 109, or refer to a component being relatively closer to the inlet of the gas turbine engine 10 as compared to a further component.

Unless otherwise stated, the terms "radial" or "radially" refer to a dimension extending between the principal and rotational axis 109 and an outwardly displaced circumference therefrom. The terms "proximal" or "proximally," unless otherwise stated, refers to a direction towards the principal and rotational axis 109, or a component being relatively closer to the principal and rotational axis 109 as compared to a further component. The use of the terms "distal" or "distally," unless otherwise stated, refers to a direction towards the outwardly displaced circumference, or a component being relatively closer to the outwardly displaced circumference as compared to a further component. Directional references (i.e., radial, axial, proximal, distal, upper, lower, upward, downward, left, right, lateral, front, back, top, bottom, above, below, vertical, horizontal, clockwise, counterclockwise, upstream, downstream, aft, etc.) are to aid the reader's understanding of the arrangement and are, unless otherwise stated, not intended to limit the position, orientation, or use. Connection references (i.e., attached, coupled, connected, and joined) are to be construed broadly and can include intermediate members and relative movement between elements unless otherwise stated. Connection references are, unless otherwise stated, not intended to infer that two elements are directly connected to, or in fixed relation to each other. Furthermore, the exemplary drawings are for purposes of illustration only and the dimensions, positions, order and relative sizes reflected in the drawings may vary.

Figure 4:
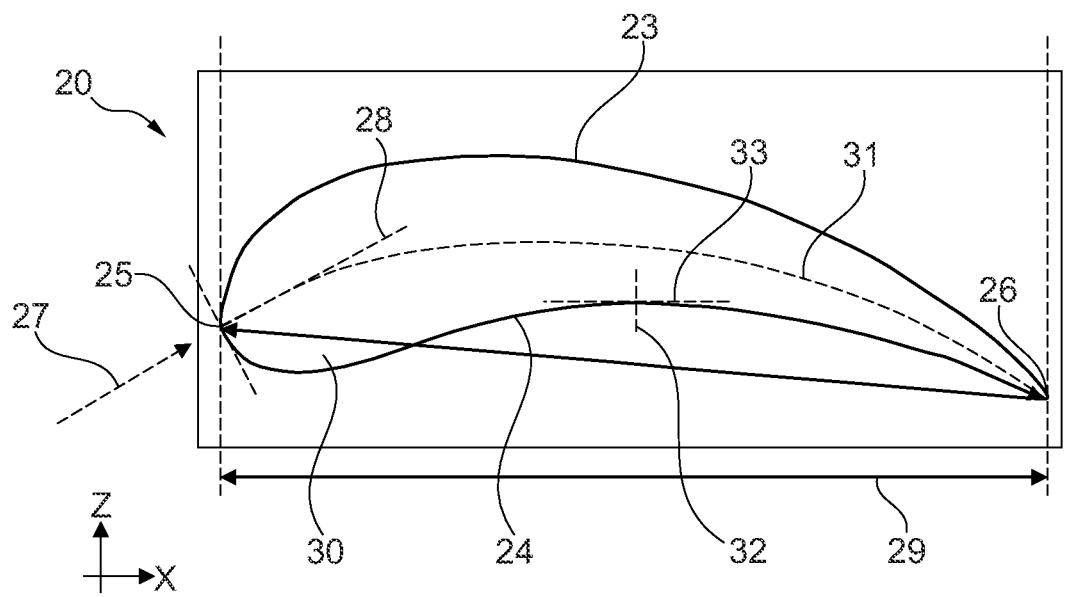
FIG. 4 shows a plan perspective of an aerofoil known within the art.

FIG. 4 shows a plan perspective of an aerofoil 20 known within the art. The aerofoil 20 comprises a suction surface 23 and a pressure surface 24. The suction surface 23, pressure surface 24, leading edge 25 and the trailing edge 26 extend between a root and a tip. The aerofoil 20 also comprises a camber line 31, which represents the mean camber extending between the leading edge 25 and the trailing edge 26. The external surface of the aerofoil 20, being that of one or more of the suction surface 23, pressure surface 24, and leading edge 25, is also shown to comprise a normal axis 32 extending in a direction perpendicular to a tangent 33 of the external surface. The normal direction 32 is shown, for example, to extend perpendicularly relative to the pressure surface 24, but may extend perpendicularly relative to any such further external surface.

The aerofoil 20 comprises a leading edge 25, and a trailing edge 26 which is aft, or downstream, of leading edge 25. The leading edge is defined, in use, by a stagnation point, the stagnation point being a region of the aerofoil 20 when incident flow splits in order to flow over either the pressure surface or the suction surface of the aerofoil 20. Thus, the leading edge 25 is the portion of the aerofoil which first meets the gas flow 27. In some examples, the leading edge 25 may represent a region of the external surface which is substantially perpendicular to the gas flow direction 27. In some examples, the leading edge 25 may represent a region of the external surface which is immediately adjacent to the area substantially perpendicular to the gas flow direction 27. In some examples, the trailing edge 26 may represent a region of the external surface where the pressure surface 24 meets the suction surface 23. In some examples, the trailing edge 26 may represent a region of the external surface, aft of the leading edge 25, where the fluid flow separated by the leading edge 25 rejoins. The trailing edge 26 is aft of the leading edge 25, so being spaced from the leading edge 25 in a chordwise direction 29. The distance between the leading edge 25 and the trailing edge 26 may be expressed as a chord length which extends along a chord line 30 between the leading edge 25 and the trailing edge 26. The chord length is the distance between the trailing edge 26 and the point on the leading edge 25 where the chord intersects the leading edge 25. The distance between the leading edge 25 and the trailing edge 26 may be expressed as a length which extends in a chordwise direction 29. The aerofoil 20 is shown to be at angled at a particular angle of attack 28, which extends parallel to the gas flow direction 27, and which may vary according to requirements. In some examples, the angle of attack may be measured relative to the chord line 30. In further examples, the angle of attack may be measured relative to the chordwise direction 29.

Figure 5:
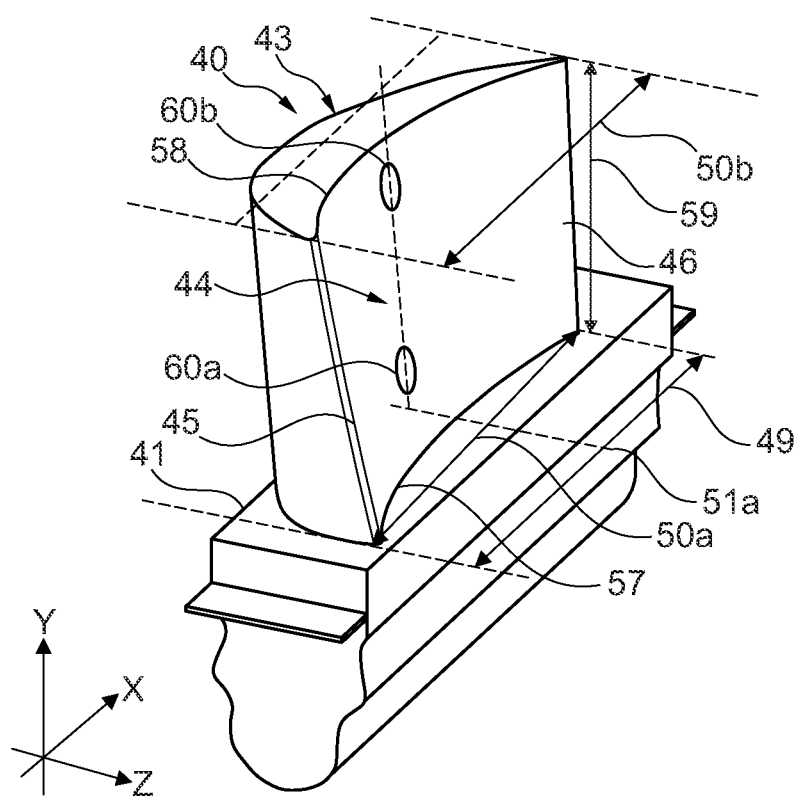
FIG. 5 shows a perspective view of an aerofoil according to described examples of the claimed disclosure.

FIG. 5 shows a perspective view of a component comprising an ice crystal ingestion or ice accretion detection arrangement according to examples. The component shown is an aerofoil 40. The aerofoil 40 forms part of a vane within a given stage of a compression system 114,115 shown in FIG. 6. The vane may be a stator. In further examples, the aerofoil 40 may be a turbine or a compressor blade for use in a defined stage of the aforementioned sub-assemblies, or a further aerofoil for use in a gas turbine engine 100. The component comprising the ice crystal ingestion or ice accretion detection arrangement may, in further examples, be formed with one or more parts of an engine casing, or any such further component comprising a gas-washed surface. In further examples, the aerofoil 40 comprises a wall comprising an external surface. The wall may be any one of a suction surface 43, a pressure surface 44, a leading edge 45 and a trailing edge 46 spaced from the leading edge 45, in a chordwise direction 49 along a chord line 50a. The aerofoil 40 may comprise a cavity (not shown) defined by an internal surface. The cavity may be configured to receive a cooling fluid, in use. The suction surface 43, pressure surface 44, leading edge 45 and the trailing edge 46 extend between a root 57 and a tip 58. The tip 58 is spaced from the root 57 in a spanwise direction 59. The spanwise direction 59 extends from the root 57 towards the tip 58. In some examples, the spanwise direction 59 extends perpendicularly from the root 57 towards the tip 58.

A first sensor 60a and a second sensor 60b are shown to be formed within the body of the aerofoil 40. It will be appreciated that, in further examples, the first sensor 60a and the second sensor 60b may be located on or at least partially within the platform 41. In further examples, the first sensor 60a and the second sensor 60b may be located on or at least partially within an external surface of the aerofoil 40. In further examples, the first sensor 60a and the second sensor 60b may be located on or at least partially within an internal surface of the aerofoil 40. The location of the first sensor 60a and the second sensor 60b within the body of the aerofoil 40 may be preferred due to ease of manufacture and placement of the first sensor 60a and the second sensor 60b. Such location may also protect the first sensor 60a and the second sensor 60b from environmental or thermal damage, which may be expected from location upon an external surface of the aerofoil 40. The two or more temperature sensors 60a,60b may include, for example, one or more of a thermocouple or a resistance temperature detectors (RTDs).

According to the example shown, both the first sensor 60a and second sensor 60b are located at a first axial location 51a, measured along the chord line 50a relative to the leading edge 45 of the aerofoil 40. In some examples, either or both of the first sensor 60a and the second sensor 60b may be located in the suction surface 43, leading edge 45, or trailing edge 46 of the aerofoil 40 at a single first axial location 51a. In some examples, either or both of the first sensor 60a and the second sensor 60b may be located in the suction surface 43, leading edge 45, or trailing edge 46 of the aerofoil 40 at a second axial location (not shown). The second axial location may be measured along the chord line 50a relative to the leading edge 45, and offset relative to the first location 51a, or vice versa. Thus, the first sensor 60a may be offset from the second sensor 60b in a chordwise direction.

The chord length is traditionally measured over a chord line 50a at a specific spanwise location, and can vary in length with radius. The chord length is defined as minimum distance from the leading edge to the trailing edge at a specified spanwise height. In FIG. 5, the chord length is measured over a chord line 50a at the root 57 of the aerofoil. Additionally or alternatively, the chord length may be measured over a chord line 50b at the tip 58 of the aerofoil. In further examples, the aerofoil 40 may comprise a number of further chord lines at various distances in the spanwise direction 59 measured relative to the root 57, on either or both of the suction surface 43 and the pressure surface 44. Such chord lines may include a chord line measured at, for example, the median location of the aerofoil 40. The chord length of the further chord lines may vary according to the degree of curvature and the shape of the respective aerofoil 40. Thus, the chordwise location of the first and second sensors 60a,60b may be expressed as a percentage value of the chord length.

Figure 6:
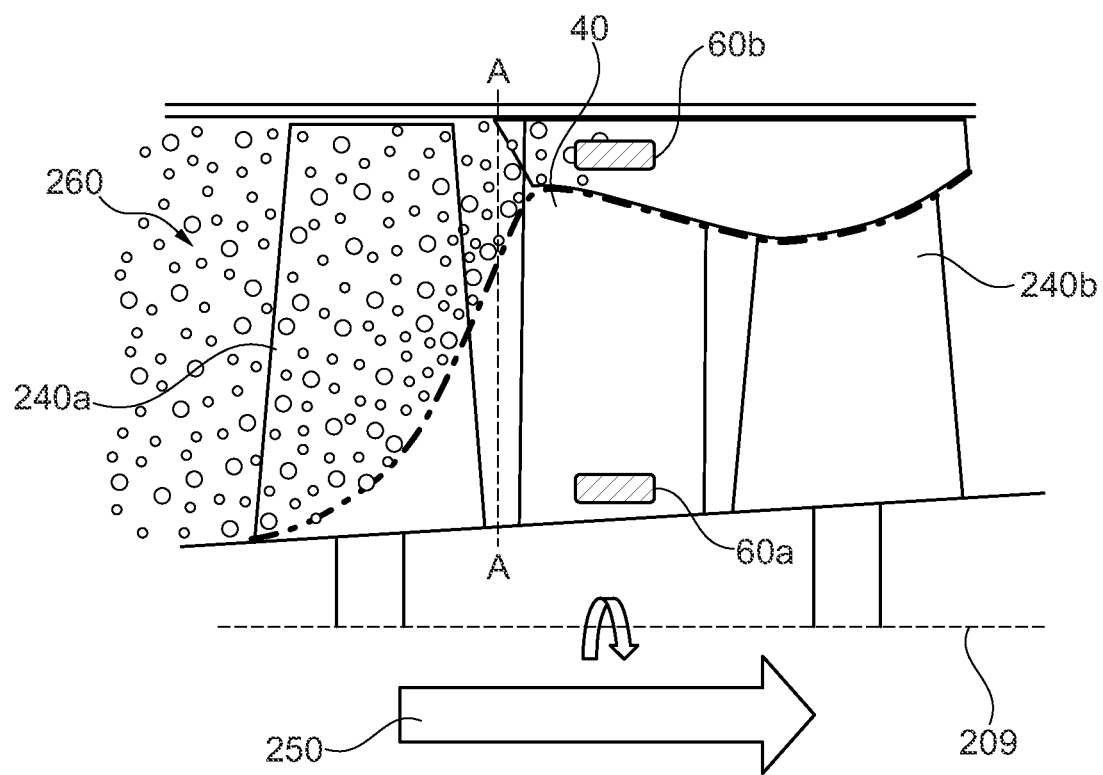
FIG. 6 shows a sectional side view of a compression section including the aerofoil of FIG. 5.

FIG. 6 shows a sectional side view of a compression section, including the aerofoil 40 previously shown in FIG. 5, which in turn forms part of a compressor within the compression system 114,115 of the gas turbine engine 100. The first sensor 60a is located at a first radial position 61a, measured along the spanwise direction 59 from either or both of the principal and rotational axis 209 and the base of the aerofoil 40 extending from the platform 41 towards the tip 58. Thus, the first sensor 60a is configured to measure the temperature of a first region of the aerofoil 40. The second sensor 60b is located at a second radial position 61b, measured along the spanwise direction 59 and extending from the root 57 towards the tip 58. Thus, the second sensor 60b is configured to measure the temperature of a second region of the aerofoil 40. Thus, the first sensor 60a is offset from the second sensor 60b in a spanwise direction 59. In this way, the first region is offset from the second region in a spanwise direction 59. In some examples, the first region is distinct from the second region. In further examples, the first region may at least partially overlap with the second region. Thus, the first radial position 61a is radially offset from the second radial position 61b, relative to either or both of the principal and rotational axis 209, and the base of the aerofoil 40 extending from the platform 41 towards the tip 58.

Also shown is radial section A-A, located immediately upstream of aerofoil 40. Adjacent the stator aerofoil 40 is shown an aerofoil 240a of an upstream rotor and an aerofoil 240b of a downstream rotor, relative to the direction of airflow 250, parallel to a principal and rotational axis 209. Also shown are the first sensor 60a and the second sensor 60b, which are formed within the body of the aerofoil 40. Thus, in some examples, the first sensor 60a and the second sensor 60b are shown to be positioned aft of the leading edge 45 of the aerofoil 40. FIG. 6 also shows a cross-sectional perspective of ingested ice or liquid water 260 within a gas flow 127. As the ingested ice or liquid water 260 flows through the compression system 114,115, it adopts a bias towards the radially outer region (outer span) of the aerofoil 40 due to the centrifugal action of the upstream and downstream rotors 240a,240b on the ingested ice or liquid water 260 present. In the region adjacent the aerofoil 240a of an upstream rotor, the ingested ice or liquid water 260 is shown to be distributed over a substantial portion of the aerofoil 240a before being centrifuged towards the outer annulus line due to passing through and being centrifugally accelerated by the rotating stage comprising the aerofoil 240a of the upstream rotor. The extent to which the ingested ice or liquid water 260 is centrifuged towards the outer annulus line depends of one or more of, for example, the rotational speed of the or each rotor 240a,240b, the geometry and solidity of the or each rotor 240a,240b, the type and size of water or ice droplets or particles contained within the ingested ice or liquid water 260, and the incoming velocity of the ingested ice or liquid water 260 within the gas flow 127. Thus, at the aerofoil 40 and the aerofoil 240b of a downstream rotor, the ingested ice or liquid water 260 is shown become concentrated towards the outer radial section of the compressor. Thus, the ingested ice or liquid water 260 may form a slurry, a water film, or may fully vaporise depending on operational conditions.

Figure 7:
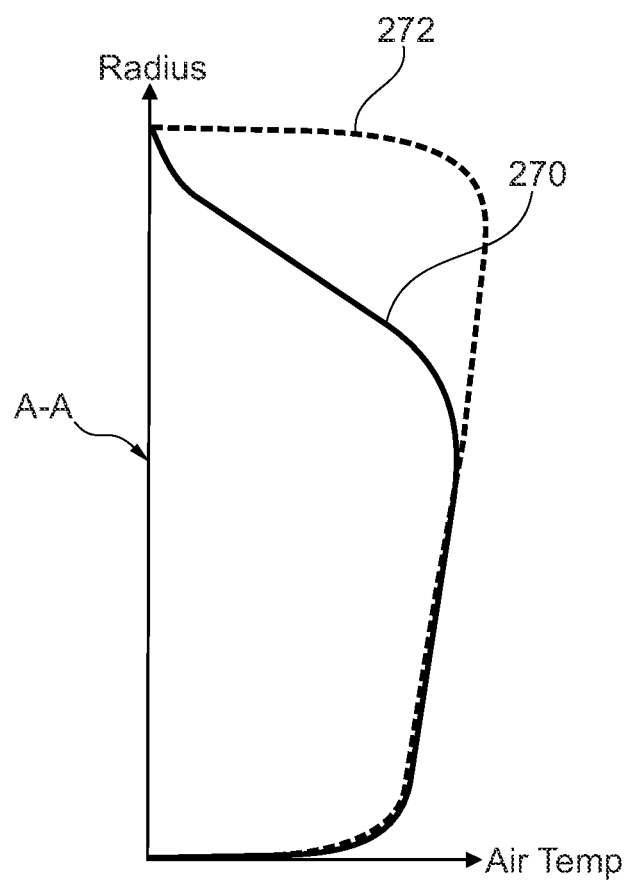
FIG. 7 shows operational temperature profiles along section A-A of FIG. 6.

FIG. 7 shows a schematic of operational radial air temperature profiles along section A-A, previously shown in FIG. 6. FIG. 7 shows a first radial air temperature profile 272 along section A-A associated with compressor operation in which no ice or liquid is being ingested. During normal operation, in dry air, the temperatures detected by the temperature sensors 60a,60b will show a stable relationship with compressor gas stream temperature, so will track compressor temperatures in a predictable manner. If ice crystal ingestion or ice accretion begins to occur on the aerofoil 40, it will preferentially build up in the radially outwardly wet region of the second sensor 60b. The melting of the ice build-up will act as a buffer, absorbing the heat from the heating element 72,76 associated with that sensor 60a,60b and driving the temperature on that surface close to zero degrees Celsius. The difference in measured temperature between the two temperature sensors 60a,60b can then be interpreted, potentially with confirmation from other engine sensors, indicating ice crystal ingestion or ice accretion within the gas turbine engine 100. To this extent, FIG. 7 also shows a first radial air temperature profile 270 along section A-A, caused by the sublimation, melting or evaporation of ice or liquid water towards the outer annulus line. In the case of the first radial air temperature profile 270, as ice sublimes or melts, or water is evaporated, heat is supplied to overcome the latent heat of the phase change. This heat is provided by the surrounding air or surfaces within the gas turbine engine 100. This leads to an air temperature depression towards the outer radial section of the compressor and a subsequent change to the first radial temperature profile 270.

Referring once again to FIG. 6, the first sensor 60a is positioned at the first radial position 61a of the aerofoil 40, which is free from the temperature depression of the first radial air temperature profile 270 generated when ice or liquid water is ingested into the gas turbine engine 100. The second sensor 60b is positioned at the second radial position 61b of the aerofoil 40, which is reliably subjected to the temperature depression of the first radial air temperature profile 270 generated when ice or liquid water is ingested into the gas turbine engine 100. Thus, according to examples, at least one second sensor 60b is positioned towards the outer annulus line, relative to one or more of the or each first sensor 60a, the principal and rotational axis 209 and the base of the aerofoil 40 extending from the platform 41 towards the tip 58. In this way, at least one second sensor 60b is situated in a second region that is reliably subjected to the temperature depression of the first radial air temperature profile 270 generated when ice or liquid water is ingested into the compressor. Additionally, at least one first sensor 60a is positioned towards the inner annulus line, relative to one or more of the or each second sensor 60b, the principal and rotational axis 209 and the base of the aerofoil 40 extending from the platform 41 towards the tip 58. In this way, at least one first sensor 60a is situated in a first region that is reliably free from the temperature depression of the first radial air temperature profile 270 generated when ice or liquid water is ingested into the compressor. Thus, the second radial position 61b of the second sensor 60b is radially offset from the first radial position 61a of the first sensor 60a. It will be appreciated that many such configurations may exist for the specific placement of the first sensor 60a and the second sensor 60b, providing the testable conditions outlined above are met.

Figure 8:
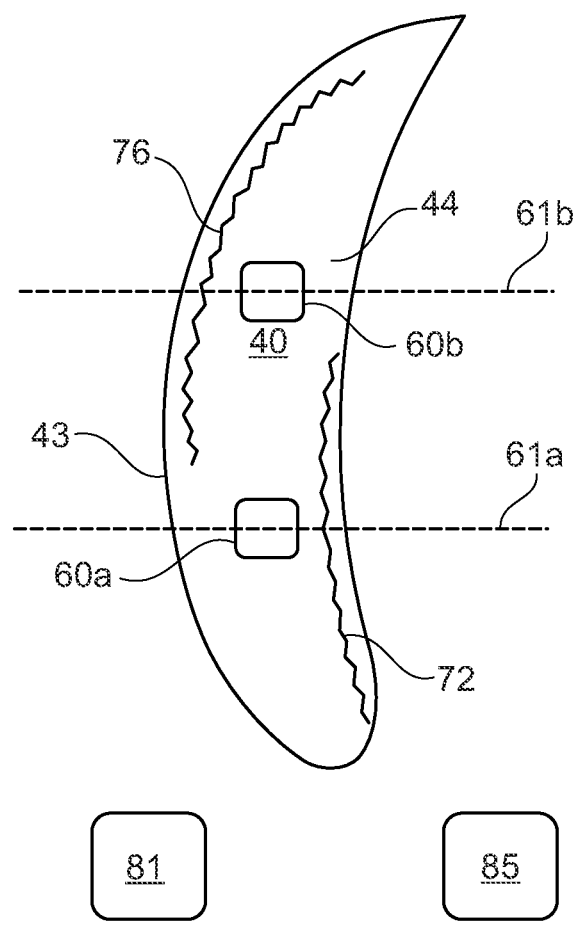
FIG. 8 shows a plan perspective of an aerofoil according to examples.

FIG. 8 shows a plan perspective of an aerofoil 40, and an alternate example of the arrangement shown in FIG. 5. The aerofoil 40 comprises a pressure surface 44 and a suction surface 43. The first temperature sensor 60a is provided between the pressure surface 44 and the suction surface 43. A first electrical heating element 72 is located adjacent the pressure surface 44. A second temperature sensor 60b is provided between the pressure surface 44 and the suction surface 43. The second electrical heating element 76 is located adjacent the suction surface 43. Each temperature sensor 60a,60b is heated by its adjacent electrical heater element 72,76. In the example shown, the spacing between the distinct regions helps to avoid the heating of one region directly influencing the temperature of the other. It will however be appreciated that in further examples, the sensors 60a, 60b and regions may be on equivalent surfaces, or in equivalent chordwise locations of the aerofoil 40. In further examples, the first temperature sensor 60a and the second temperature sensor 60b may be located off-centre, i.e. off the camber line 31. Thus, either or both of the first temperature sensor 60a the second temperature sensor 60b may be located towards the pressure surface 44, i.e. off the camber line 31. In further examples, either or both of the first temperature sensor 60a the second temperature sensor 60b may be located towards the suction surface 43, i.e. off the camber line 31, according to requirements.

In the example shown, the first temperature sensor 60a and the second temperature sensor 60b are offset in the chordwise direction. It will also be appreciated that the electrical heater elements 72,76 are offset in the chordwise direction. Thus, the second axial location 51b may be measured along the chord line 50a relative to the leading edge 45, and offset relative to the first location 51a, or vice versa. Although not shown, it will be appreciated that the first temperature sensor 60a and the second temperature sensor 60b are also offset in the spanwise direction. It will also be appreciated that the electrical heater elements 72,76 are offset in the spanwise direction. Thus, in some examples, the first and second heated regions may be both distinct, and offset in the spanwise direction such that the first temperature sensor 60a and the second temperature sensor 60b are radially offset.

The first and second heated regions refer to the areas of the aerofoil, or aerofoil 40, heated by the respective heating elements 72,76. The size of the respective heated regions may be enlarged or reduced according to, for example, the size, shape, location, power requirements or input of the respective heating elements 72,76. The first electrical heater element 72 and the second electrical heater element 76 are also shown to be offset in the chordwise direction 59. The first sensor 60a is configured to measure the temperature of a first region of the aerofoil 40. The second sensor 60b is configured to measure the temperature of a second region of the aerofoil 40. In some examples, the first region is distinct from the second region. In further examples, the first region may at least partially overlap with the second region. Thus, in some examples, the first temperature sensor 60a and the second temperature sensor 60b are axially offset.

The two temperature sensors 60a,60b provide temperature information in the regions of interest. Thus, the second sensor 60b is located, during use, in the wet region. Conversely, the first sensor 60a is situated in a radially inward region that is reliably not subjected to an intercooling effect of one or more of rain, hail or ice crystals. Thus, the second sensor 60b is located, during use, in the dry region.

Referring again to FIG. 8, a controller 81 and a memory 85 are also shown. The controller may comprise a comparator to perform the comparison step between the temperature measured by the temperature sensors 60a,60b or a reference value, which can be stored in the memory 85, or directly between the readings of the first and second temperature sensors 60a,60b. The memory 85 may also record measured temperature values over time to create a measured temperature profile for comparison with a reference profile.

Controller 81 can control various aspects of the apparatus, including one or more of heater operation, temperature measurement intervals, and data recording and comparison. In use, computer readable instructions may be provided to the controller 81, which may form part of a standard engine controller, for example a full authority digital engine/electronics control (FADEC), or may be provided as a stand-alone unit.

The ability to detect and respond to ice crystal ingestion or ice accretion will eliminate a fuel burn penalty currently caused by the need to defend engines in all conditions in which crystal icing could occur.

Figure 9:
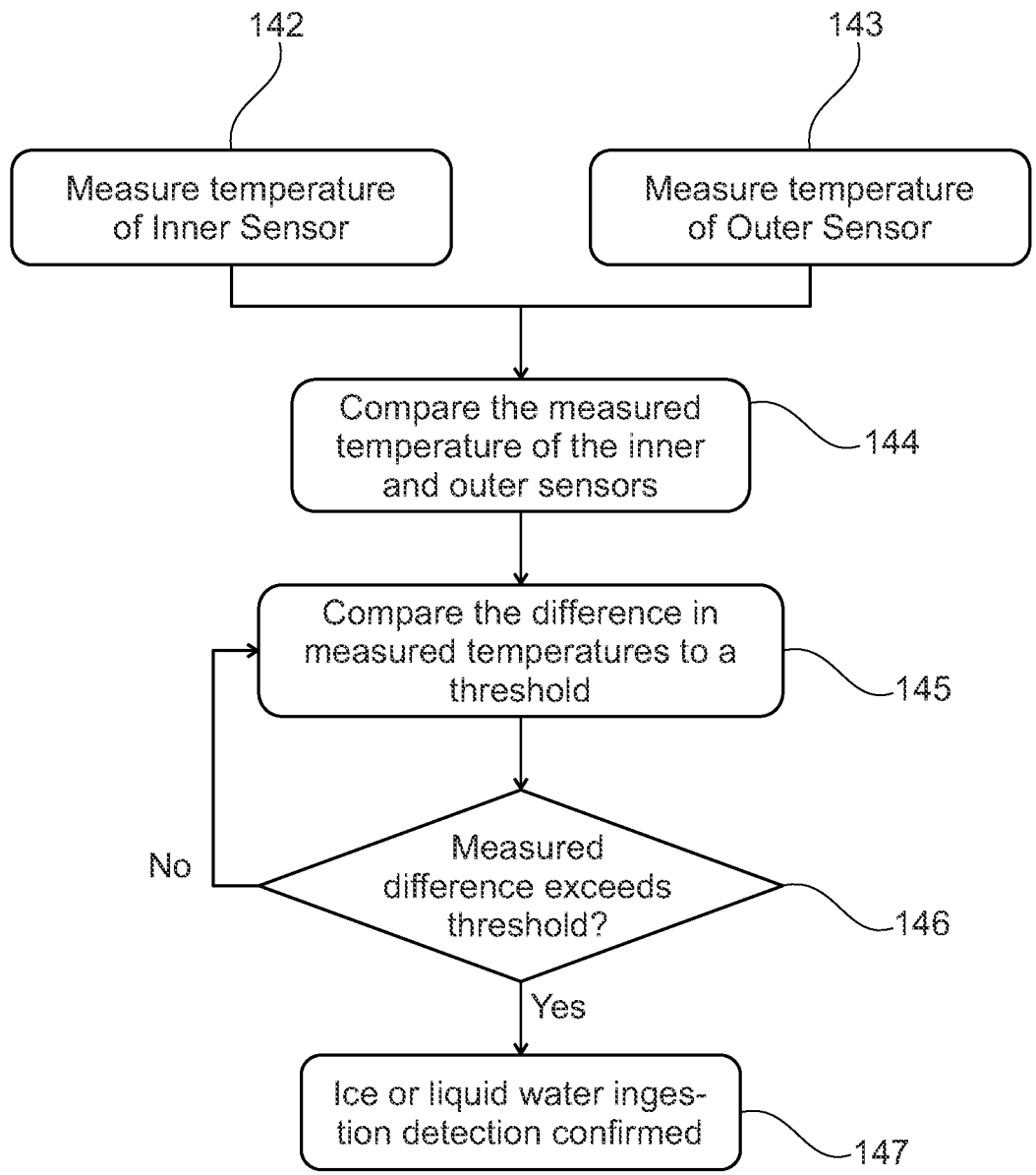
FIG. 9 shows a flow chart illustrating a first example of a method according to examples.

As ice or liquid water is ingested into the compressor the temperature measured by the second sensor 60b is appreciably lower than that by the first sensor 60a. The difference in measured temperature between the first sensor 60a and the second sensor 60b is compared against a threshold which may vary with compressor operating condition. If the difference in measured temperature exceeds the threshold, the ingestion of ice or liquid water ingestion may be confirmed. During use, when no ice or liquid water is being ingested, a small difference in the measured temperature between the first sensor 60a and second sensor 60b may exist due to the aerodynamic design of the compressor. If necessary, such differences may be accounted or corrected for, using knowledge of the compressor behaviour or operational characteristics. Thus, in a first example, a method of detecting ice crystal ingestion or ice accretion on an aerofoil 40, during use, is illustrated in FIG. 9. In a first step 142, the temperature of the first region is monitored during use at 142, and compared at step 144. The value calculated at step 144 is compared with a predetermined reference, temperature value, temperature profile, or threshold at step 145. At step 146, if the measured difference exceeds the predetermined reference, temperature value, temperature profile, or threshold of step 145, at step 147, ingestion of ice or liquid water may be confirmed. At step 146, if the measured difference does not exceed the predetermined reference, temperature value, temperature profile, or threshold of step 145, ingestion of ice or liquid water remains unconfirmed.

At low air temperatures, such as in the front stages of a compression system during high altitude flight, the saturation vapour pressure of the air is low. Thus, the temperature depression generated by the ingestion of ice or liquid water into the compressor may be small and may be difficult to reliably detect given the measurement accuracy of the first sensor 60a and the second sensor 60b, which may be either or both of thermocouples or RTD sensors.

Figure 10:
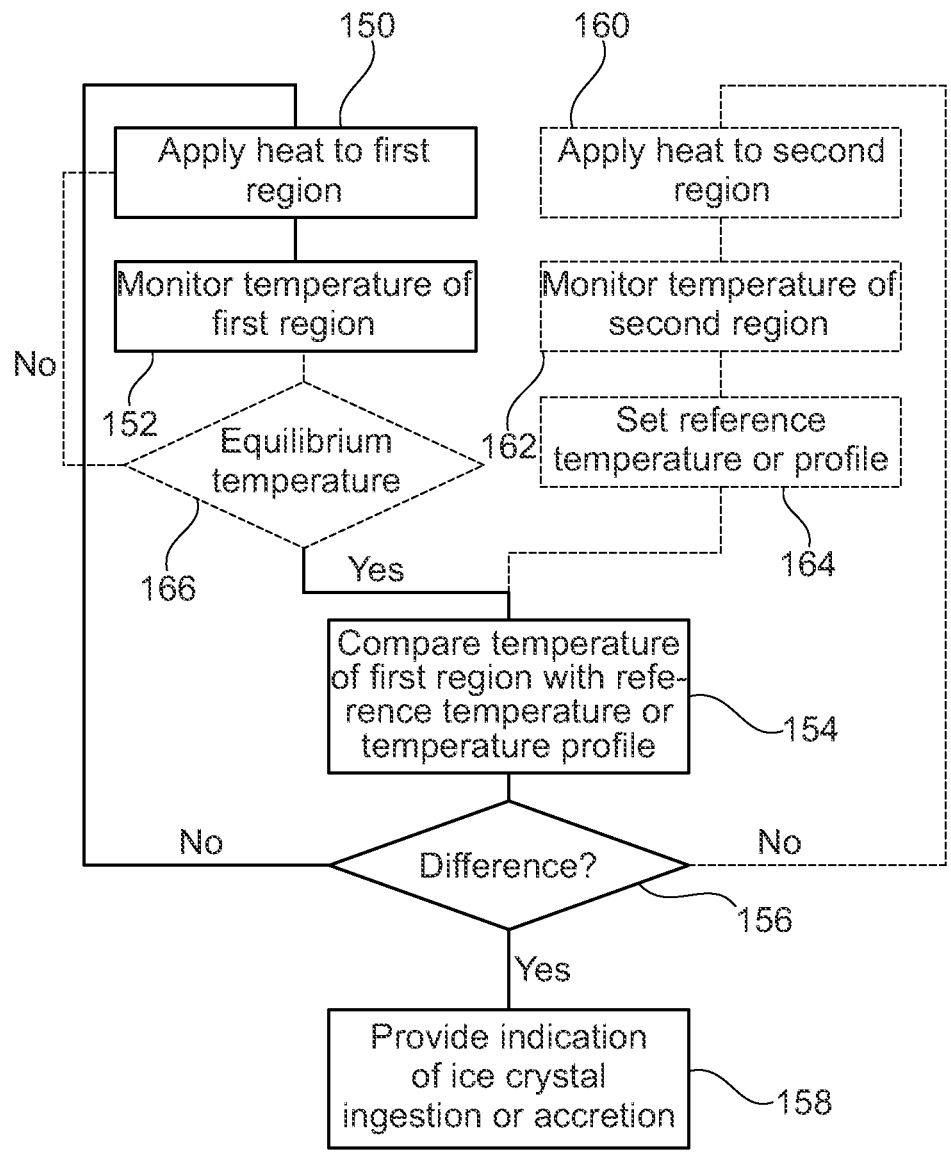
FIG. 10 shows a flow chart illustrating a second example of a method according to examples; and, FIG. 11 shows a sectional side view of the aerofoil according to examples.

In further examples, either or both of the first sensor 60a and the second sensor 60b may be replaced with one or more electrically heated sensors which increase the observable temperature depression local to each respective sensor. In such examples, one or more heated sensors may be positioned on the surface of, or may be at least partially embedded within, a compressor stator vane, within a given stage of the compression system. The or each sensor may be heated using an electrical power supply to maintain a constant temperature. This temperature may vary according to gas turbine engine 100 operating condition. Thus, as the second sensor is cooled by the ingested ice or liquid water the electrical power required to keep it at its constant temperature increases. In this way, electrical power requirements of each sensor may be compared against each other, with the difference in electrical power required between each sensor being compared against a threshold which may vary with compressor operating condition. If the measured difference exceeds the threshold then the ingestion of ice or liquid water may be confirmed. Thus, in a second example, a method of detecting ice crystal ingestion or ice accretion on a aerofoil 40, during use, is illustrated in FIG. 10. In a first step 150, heat is applied to a first region of a aerofoil 40 during use. The temperature of the first region is monitored during use at 152, and compared with a second, reference, temperature value or temperature profile at step 154. If the comparison 154 shows no difference, then the heating, monitoring and comparing steps 150,152,154 are repeated until interrupted by a user, or stopped based on a predetermined time or temperature threshold. If the comparison 154 shows a difference at step 156, then an indication of ice crystal ingestion or ice accretion is provided at step 158. Ice crystal ingestion or ice accretion may be detected based simply on a comparison, at step 154, of the monitored temperatures of the first region 152 with a reference temperature close to zero degrees Celsius, for example in the range of zero to five degrees Celsius such as one or two degrees Celsius.

Alternatively, heat may also be applied to second region of the aerofoil 40, during use, at step 160, and the temperature of the second region monitored during use at 162 to provide the reference temperature value or update a reference temperature profile 164 for use in the comparison step 154. Heat may be applied directly to the first region of the aerofoil 40 at step 150 and/or to the second region of the aerofoil 40 at step 160, for example using an electrical heating element.

Heat may be applied 150,160 to the first and/or second region constantly during use of the aerofoil 40, or may be applied 150,160 to heat the first and/or second region to an equilibrium temperature. In this case, the method includes the step of checking whether an equilibrium temperature has been reached, at step 166, and the comparing step 154 is performed only once the first and/or second region has reached said equilibrium temperature.

As a further alternative, the rate of temperature increase of a region may be monitored as the heat is applied, by monitoring the temperature of the first region over time at step 152. This provides a measured heating profile which is compared to a reference heating/temperature profile at step 154.

Heat may be applied only once, periodically, at irregular intervals or on demand, for example when the gas turbine engine 100 operating point changes, or based on some other trigger. The heat may be applied for a predetermined amount of time or until a set temperature or gas turbine engine 100 operating point is reached, or the application of heat may be entirely controlled by a user.

Figure 11:
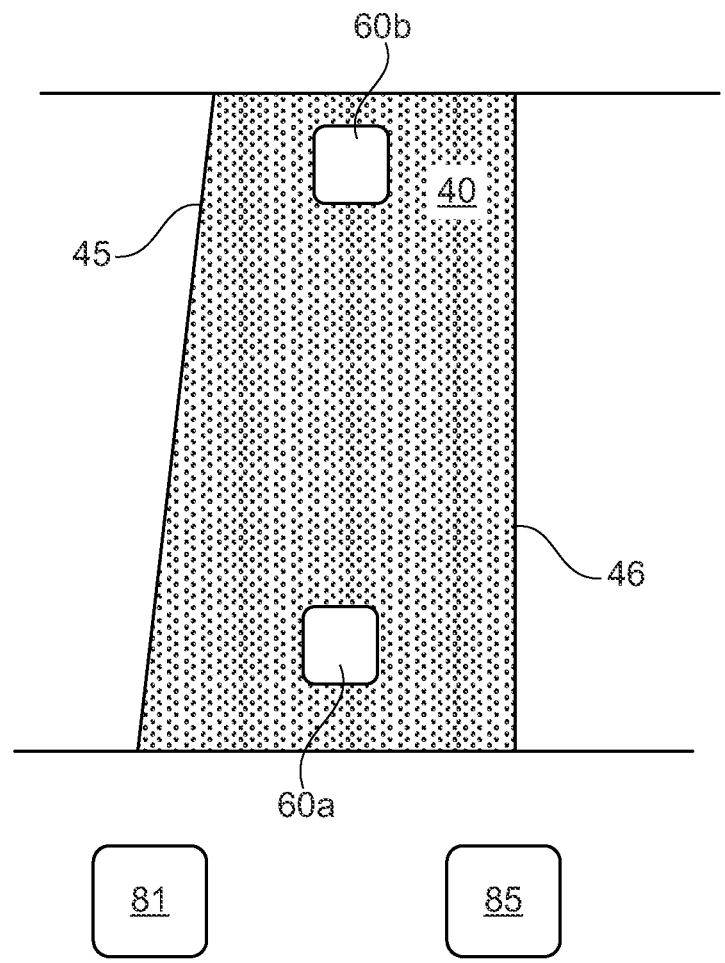

FIG. 11 shows a schematic view of a further example of an aerofoil 40. In FIG. 11, the first temperature sensor 60a and first electrical heating element 72 are provided at a first radial position 61a on the aerofoil 40. Furthermore, the second temperature sensor 60b and second electrical heater element 76 are provided at a second radial position 61b on the aerofoil 40. Thus, the aerofoil 40 is an electrically conductive member.

The aerofoil 40 may be configured so that upon application of a current by the first sensor 60a or the second sensor 60b, an electrical property of the aerofoil 40 may be monitored to determine a temperature. The electrical property may be resistance. In further examples, either or both of the first sensor 60a and the second sensor 60b may be configured to determine the impedance of the aerofoil 40. Thus, the electrical property may be impedance.

The temperature of the aerofoil 40 at either or both of the first region and the second region may monitored or determined in this way in an equivalent manner to that described in relation to FIGS. 9-11. It will also be appreciated that the arrangement may be equally applied to any further structure described herein.

According to a further example, a hot wire may be used, in place of either or both of the temperature sensors 60a,60b and a heating element, with a current being passed through the wire and its resistance being measured. It will be appreciated that a hot wire is a sensor. The hot wire sensor may be made from a length of resistance wire. Furthermore, the hot wire may be, for example, circular in section. Since resistance is proportional to temperature, this would also be effective in showing the presence or absence of ice accretion. Thus, a measured temperature difference between the first and second temperature sensors 60a,60b is indicative of ice crystal ingestion or ice accretion. Again, a controller 81 and memory 85, as previously described, are provided in the systems of FIGS. 6-8.

In further examples, a 'dry' probe, such as that described in relation to FIGS. 5-11 may be replaced with a synthesized/modelled value, such as the arrangements and methods described and claimed in EP application no. 17178665.0. and EP application no. 17169041.5 herein incorporated by reference. Such a synthesized/modelled value may be generated, for example, by the engine controller, from one or more of a compressor shaft speed and a gas turbine engine 100 temperature. In yet further examples, the rate of change of power consumption of the wet sensor may be used to infer the occurrence of ice crystal ingestion or ice accretion. In this way, in further examples, the first sensor 60a may be replaced by a calculated (synthesised) value within the engine control system. This synthesised value may be developed based on the engine manufacturer's knowledge of the compressor behaviour. Such an arrangement may further reduce the cost and complexity of incorporating the first sensor 60a and may offer an advantage in increasing system reliability.

In further examples, one or more of the sensors 60a,60b may be either incorporated at least partially within, or applied to any other compressor static hardware that is capable of exploiting the difference in radial temperature profile when ice or liquid water is ingested, and that may offer a more straightforward physical implementation which avoids some of the challenges above. Such hardware may include static structures (e.g. compressor inlet structures, inter case struts, bypass outlet guide vanes, A-frames etc.), or the inner and outer compressor casings or the stator vane platforms (tops and bottoms of the vane). One or more of the sensors 60a,60b may also be positioned on a purpose built body that is inserted within the main gas flow at an appropriate position in the compressor. Such an arrangement may make the system more easily line replaceable, and may simplify addition, removal, or replacement of the sensors 60a,60b.

It will be understood that the invention is not limited to the embodiments above-described and various modifications and improvements can be made without departing from the concepts described herein.

Except where mutually exclusive, any of the features may be employed separately or in combination with any other features and the disclosure extends to and includes all combinations and sub-combinations of one or more features described herein.

We claim:

1. An apparatus for detecting either or both of water or ice crystal ingestion and ice accretion on an aerofoil that is within a gas turbine engine having a principal rotational axis, the apparatus comprising:
    a first temperature sensor for determining a first temperature value at a first radial position within a first region of the aerofoil, relative to the principal rotational axis of the gas turbine engine;
    a second temperature sensor for determining a second temperature value at a second radial position within a second region of the aerofoil, relative to the principal rotational axis of the gas turbine engine;
    a first heater for applying heat to the first region of the aerofoil;
    a second heater for applying heat to the second region of the aerofoil; and
    a comparator for comparing the first temperature value with the second temperature value, wherein:
    the second radial position of the second sensor is radially offset from the first radial position of the first sensor;
    either or both of the first temperature sensor and the second temperature sensor are positioned aft of a leading edge of the aerofoil;
    the first temperature sensor and the second temperature sensor are located between pressure and suction surfaces of the aerofoil so as to be within the aerofoil;
    the aerofoil is a stator vane within a compressor of the gas turbine engine;
    in use of the gas turbine engine, the ingested water or ice crystal is distributed across only part of the aerofoil; and
    one of the first and second radial positions is located in the part of the aerofoil across which the ingested water or ice crystal is distributed and the other of the first and second radial positions is located in a part of the aerofoil across which the ingested water or ice crystal is not distributed.

2. The apparatus as claimed in claim 1, wherein at least one of the first and second heaters is located on or at least partially within the aerofoil.

3. The apparatus as claimed in claim 1, wherein the aerofoil is electrically conductive, the aerofoil being configured so that upon application of a current, an electrical property of the aerofoil is monitored to determine a temperature.

4. The apparatus as claimed in claim 3, wherein the electrical property is resistance.

5. A vane for use in a gas turbine engine, the vane comprising the apparatus as claimed in claim 1.

6. A gas turbine engine comprising the vane as claimed in claim 5.

7. A strut for use in a gas turbine engine, the strut comprising the apparatus as claimed in claim 1.

8. The apparatus as claimed in claim 1, wherein one of the first heater and the second heater extends rearward past a midpoint of the aerofoil in a chordwise direction of the aerofoil so as to be closer to a trailing edge of the aerofoil in the chordwise direction than the first and second temperature sensors.

9. An apparatus for detecting either or both of water or ice crystal ingestion and ice accretion on an aerofoil that is within a gas turbine engine having a principal rotational axis, the apparatus comprising:
- a first temperature sensor and a second temperature sensor positioned aft of a leading edge of the aerofoil, wherein a second radial position of the second sensor is radially offset from a first radial position of the first sensor;
- a first heater for applying heat to a first region of the aerofoil;
- a second heater for applying heat to a second region of the aerofoil; and
- a controller configured to read computer readable instructions to execute steps to:
  - apply heat from the first heater to the first region of the aerofoil, during use;
  - determine a first temperature value at the first radial position within the first region of the aerofoil, relative to the principal rotational axis of the gas turbine engine, with the first temperature sensor;
  - apply heat from the second heater to the second region of the aerofoil, during use;
  - determine a second temperature value at the second radial position within the second region of the aerofoil, relative to the principal rotational axis of the gas turbine engine, with the second temperature sensor; and
  - compare the first temperature value with the second temperature value, wherein:
- ice crystal ingestion or ice accretion is detected based on the comparison of the first temperature value with the second temperature value, during use;
- the first temperature sensor and the second temperature sensor are located between pressure and suction surfaces of the aerofoil so as to be within the aerofoil;
- the aerofoil is a stator vane within a compressor of the gas turbine engine;
- in use of the gas turbine engine, the ingested water or ice crystal is distributed across only part of the aerofoil; and
- one of the first and second radial positions is located in the part of the aerofoil across which the ingested water or ice crystal is distributed and the other of the first and second radial positions is located in a part of the aerofoil across which the ingested water or ice crystal is not distributed.

10. The apparatus as claimed in claim 9, wherein the aerofoil is an electrically conductive member, the aerofoil being configured so that upon application of a current, an electrical property of the aerofoil is monitored to determine a temperature.

11. The apparatus as claimed in claim 10, wherein the electrical property is resistance.

12. The apparatus as claimed in claim 9, wherein the controller is configured to read the computer readable instructions to control either or both of the first and the second heaters to apply heat constantly during use of the aerofoil.

13. The apparatus as claimed in claim 9,
wherein the controller is configured to read the computer readable instructions to control either or both of the first and the second heaters to apply heat to heat a region to an equilibrium temperature, and
wherein the comparing step is performed only once the region has reached the equilibrium temperature.

14. The apparatus as claimed in claim 9, further comprising a memory, and wherein the controller is configured to read the computer readable instructions to execute steps to:
- monitor the rate of temperature increase of the first region and the second region as the heat is applied to provide respective measured heating profiles;
- store the measured heating profiles in the memory; and
- compare the measured heating profiles, in the comparing step, to reference temperature profiles.

15. The apparatus as claimed in claim 9, wherein the controller comprises a comparator for comparing the temperature determined by the first temperature sensor with the temperature determined by the second temperature sensor.

16. The apparatus as claimed in claim 9, wherein one of the first heater and the second heater extends rearward past a midpoint of the aerofoil in a chordwise direction of the aerofoil so as to be closer to a trailing edge of the aerofoil in the chordwise direction than the first and second temperature sensors.

* * * * *